(12) United States Patent
Mateo et al.

(10) Patent No.: US 11,002,153 B2
(45) Date of Patent: May 11, 2021

(54) BALANCE BRACKET

(71) Applicant: UNITED TECHNOLOGIES CORPORATION, Farmington, CT (US)

(72) Inventors: Alberto A. Mateo, Vernon, CT (US); Tracy A. Propheter-Hinckley, Rocky Hill, CT (US); San Quach, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 199 days.

(21) Appl. No.: 16/031,057

(22) Filed: Jul. 10, 2018

(65) Prior Publication Data

US 2020/0018188 A1 Jan. 16, 2020

(51) Int. Cl.
| F01D 9/06 | (2006.01) |
| F01D 25/26 | (2006.01) |
| F04D 29/54 | (2006.01) |
| F16M 13/02 | (2006.01) |

(52) U.S. Cl.
CPC .............. *F01D 25/26* (2013.01); *F01D 9/06* (2013.01); *F04D 29/541* (2013.01); *F16M 13/02* (2013.01); *F05D 2240/14* (2013.01); *F05D 2250/18* (2013.01); *F05D 2250/75* (2013.01); *F05D 2260/941* (2013.01)

(58) Field of Classification Search
CPC ........ F01D 25/24; F01D 25/243; F01D 25/26; F01D 25/265; F01D 25/28; F01D 9/06; F01D 9/065; F02C 7/20; F02C 7/32; F05D 2260/941

See application file for complete search history.

(56) References Cited

U.S. PATENT DOCUMENTS

| 7,614,236 B2 | 11/2009 | Mandet et al. | |
| 7,661,273 B2 | 2/2010 | Commaret et al. | |
| 9,803,868 B2 | 10/2017 | Moehrle et al. | |
| 2010/0281848 A1* | 11/2010 | Hohmann | F23Q 3/006 |
| | | | 60/39.827 |
| 2012/0110821 A1 | 5/2012 | Callaghan | |
| 2015/0240662 A1* | 8/2015 | Niggemeier | F01D 25/24 |
| | | | 415/207 |
| 2016/0201562 A1* | 7/2016 | Chasse, Jr. | F02C 7/22 |
| | | | 60/739 |
| 2018/0171876 A1* | 6/2018 | Yang | B33Y 80/00 |

FOREIGN PATENT DOCUMENTS

| EP | 2012060 | 1/2009 |
| EP | 3266993 | 1/2018 |

OTHER PUBLICATIONS

European Patent Office, European Search Report dated Nov. 28, 2019 in Application No. 19185485.0.
European Patent Office, European Office Action dated Sep. 15, 2020 in Application No. 19185485.0.

* cited by examiner

*Primary Examiner* — Gerald L Sung
*Assistant Examiner* — Rene D Ford
(74) *Attorney, Agent, or Firm* — Snell & Wilmer L.L.P.

(57) ABSTRACT

A balance bracket for a diffuser case of gas turbine engine is disclosed. In various embodiments, the balance bracket includes a first portion configured for mounting to a first boss on the diffuser case, a second portion configured for mounting to a second boss on the diffuser case, the second portion spaced a distance from the first portion, and a first undulating portion positioned intermediate the first portion and the second portion.

15 Claims, 5 Drawing Sheets

BALANCE BRACKET

FIELD

The present disclosure relates generally to gas turbine engines and, more particularly, to balance brackets configured for stress relief on diffuser cases of gas turbine engines.

BACKGROUND

Gas turbine engines, such as those used to provide thrust to an aircraft, are internal combustion engines that use air as the working fluid. In general, the gas turbine engines include a fan section and a core engine located downstream of the fan section. The core engine generally includes a compressor section, one or more combustors, and a turbine section. During operation, air is drawn into the fan section and accelerated by rotating fan blades. A fraction of the indrawn air is routed through the core engine, where it is compressed and pressurized by rotating blades of the compressor section before entering the combustor section. In the combustor section, the air is combusted with fuel to generate hot combustion gases. The hot combustion gases expand through and drive the turbine section, which extracts energy from the gases to power the compressor and fan sections. The hot gases are then expelled through an exhaust nozzle. Prior to entry into the combustor section, the compressed air from the compressor section passes between stator vanes and then through a diffuser section. The diffuser section has an expanding cross sectional area in the direction of the airflow to decrease the velocity and increase the static pressure of the compressed air. This prepares the air for entry into the combustion section at low velocity to permit proper mixing with fuel.

SUMMARY

A balance bracket for a diffuser case of a gas turbine engine is disclosed. In various embodiments, the balance bracket includes a first bracket portion configured for mounting to a first boss on the diffuser case, a second bracket portion configured for mounting to a second boss on the diffuser case, the second bracket portion spaced a distance from the first bracket portion, and a first undulating portion positioned intermediate the first bracket portion and the second bracket portion.

In various embodiments, the first undulating portion defines a first thickness in a thickness cross section and the first thickness is less than or equal in value to a nominal thickness of the first bracket portion of the balance bracket. In various embodiments, the first undulating portion includes a C-shape in the thickness cross section. In various embodiments, the first undulating portion includes a S-shape in the thickness cross section.

In various embodiments, the first undulating portion defines a first width in a width cross section and the first width is less than or equal in value to a nominal width of the first bracket portion of the balance bracket. In various embodiments, the first undulating portion includes an hourglass shape in the width cross section. In various embodiments, the first undulating portion includes a double hourglass shape in the width cross section.

In various embodiments, the first undulating portion defines a first thickness in a thickness cross section and the first thickness is less than a nominal thickness of the first bracket portion of the balance bracket, and the first undulating portion defines a first width in a width cross section and the first width is less than a nominal width of the first bracket portion of the balance bracket.

In various embodiments, the first bracket portion is configured for mounting to the first boss and to a third boss and the balance bracket includes a second undulating portion positioned intermediate the first boss and the third boss. In various embodiments, the first undulating portion defines a first cross sectional area and the second undulating portion defines a second cross sectional area and at least one of the first cross sectional area and the second cross sectional area is less in value than a nominal cross sectional area of the balance bracket.

An outer diffuser case assembly for a gas turbine engine is disclosed. In various embodiments, the outer diffuser case assembly includes a housing defining an outer surface and having a longitudinal axis, a first boss extending radially outward of the housing, a second boss extending radially outward of the housing, and a balance bracket. In various embodiments, the balance bracket includes a first portion configured for mounting to the first boss, a second portion configured for mounting to the second boss, the second portion spaced a distance from the first portion, and a first undulating portion positioned intermediate the first portion and the second portion.

In various embodiments, the first undulating portion defines a first thickness in a thickness cross section and the first thickness is less than or equal in value to a nominal thickness of the first portion of the balance bracket. In various embodiments, the first undulating portion includes at least one of a C-shape in the thickness cross section and a S-shape in the thickness cross section.

In various embodiments, the first undulating portion defines a first width in a width cross section and wherein the first width is less than or equal in value to a nominal width of the first portion of the balance bracket. In various embodiments, the first undulating portion includes an hourglass shape in the width cross section.

In various embodiments, the first portion is configured for mounting to the first boss and to a third boss and the balance bracket includes a second undulating portion positioned intermediate the first boss and the third boss. In various embodiments, the first undulating portion defines a first cross sectional area and the second undulating portion defines a second cross sectional area and at least one of the first cross sectional area and the second cross sectional area is less in value than a nominal cross sectional area of the balance bracket.

A gas turbine engine is disclosed. In various embodiments, the gas turbine engine includes a compressor and an outer diffuser case assembly positioned downstream of the compressor. In various embodiments, the outer diffuser case assembly includes a housing defining an outer surface, a first boss extending radially outward of the housing, a second boss extending radially outward of the housing, and a balance bracket. In various embodiments, the balance bracket includes a first portion configured for mounting to the first boss, a second portion configured for mounting to the second boss, the second portion spaced a distance from the first portion, and a first undulating portion positioned intermediate the first portion and the second portion.

In various embodiments, the first portion is configured for mounting to the first boss and to a third boss extending radially outward of the housing and the balance bracket includes a second undulating portion positioned intermediate the first boss and the third boss. In various embodiments, the first undulating portion defines a first thickness in a thickness cross section, the first thickness is less than or equal in value to a nominal thickness of the first portion of the balance bracket, and the first undulating portion includes at least one of a C-shape in the thickness cross section and a S-shape in the thickness cross section.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
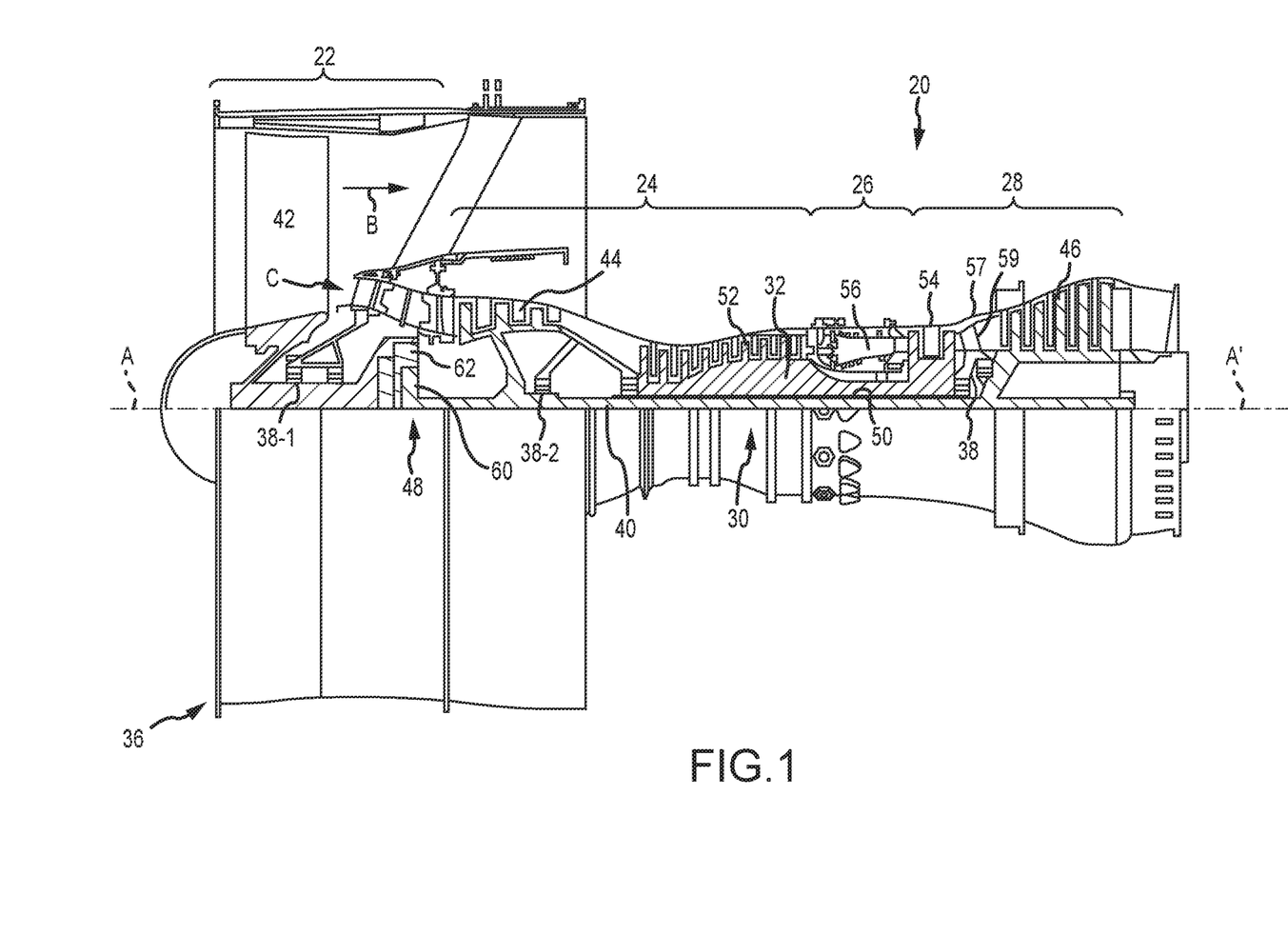
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the fan drive gear system 48.

During operation of the gas turbine engine 20, the air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
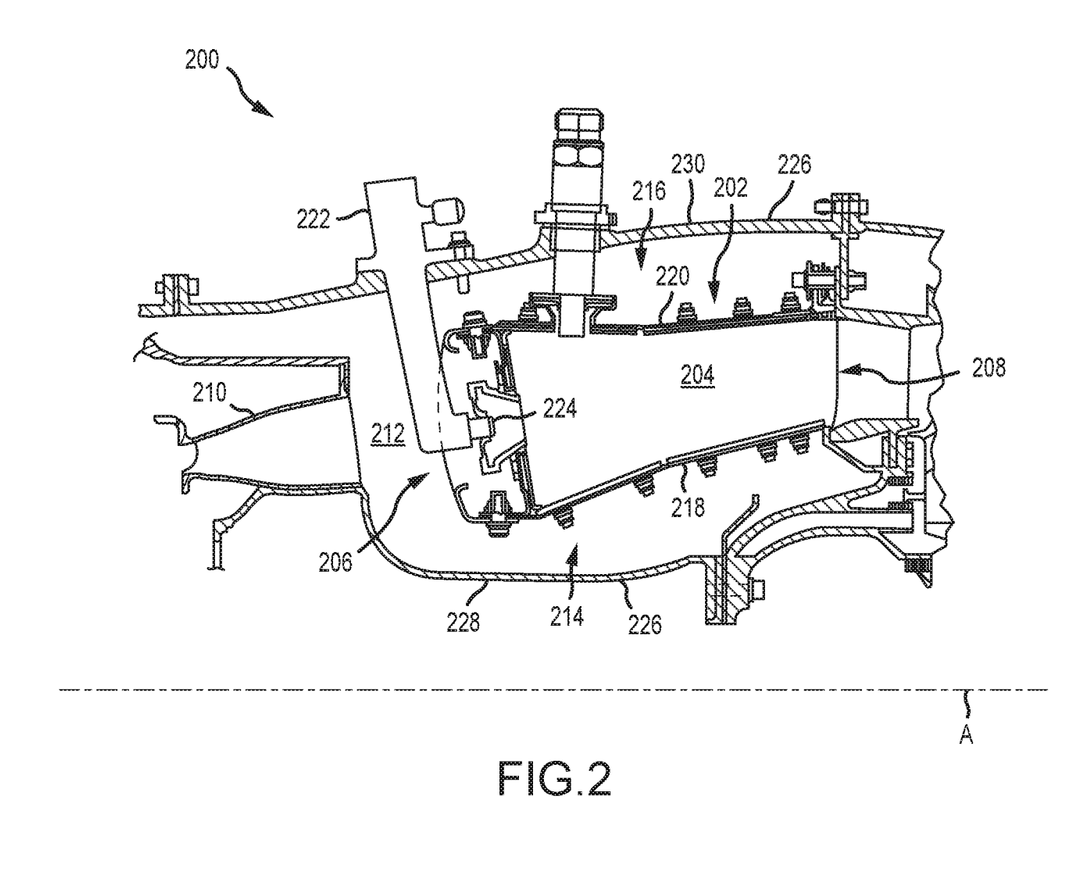
FIG. 2 is a cross sectional schematic view of a diffuser-combustor assembly of a gas turbine engine, in accordance with various embodiments.

Referring now to FIG. 2, a diffuser-combustor assembly 200 is illustrated schematically. In various embodiments, the diffuser-combustor assembly 200 includes a combustor 202, such as, for example, the combustor 56 described above with reference to FIG. 1. As illustrated, the combustor 202 defines a combustion chamber 204 internal to the combustor 202. The combustor 202 includes a combustor inlet 206, leading compressed air from a compressor to the combustion chamber 204, and a combustor outlet 208, leading a combusted fuel/air mixture from the combustion chamber 204 to a turbine. In various embodiments, the compressor and turbine just referred to comprise the compressor section 24 and the turbine section 28, respectively, described above with reference to FIG. 1. A pre-diffuser 210 is disposed upstream of the combustor inlet 206 and configured to supply compressed air into a shroud cavity 212. Compressed air from a compressor section, such as, for example, the compressor section 24 described above with reference to FIG. 1, may then flow into the shroud cavity 212, which includes an inner diameter branch 214 and an outer diameter branch 216. The air from the inner diameter branch 214 and the outer diameter branch 216 may then enter the combustion chamber 204 through one or more apertures extending through an inner combustor panel 218 and an outer combustor panel 220, as well as through the combustor inlet 206. At the same time, fuel may be supplied into the combustion chamber 204 from a fuel injector 222 and a pilot nozzle 224. The fuel and air is mixed within the combustion chamber 204 and ignited to produce a high-temperature combusted fuel/air product mixture. The combusted fuel/air product mixture then exits the combustion chamber 204 through the combustor outlet 208, which is positioned upstream from a turbine section, such as the turbine section 28 described above with reference to FIG. 1. In various embodiments, the diffuser-combustor assembly 200 is surrounded by a shroud case 226. The shroud case 226 may comprise a radially inner portion that defines an inner diffuser case 228 and a radially outer portion that defines an outer diffuser case 230. As illustrated, the combustor 202 is positioned and secured between the inner diffuser case 228 and the outer diffuser case 230.

Figure 3A:
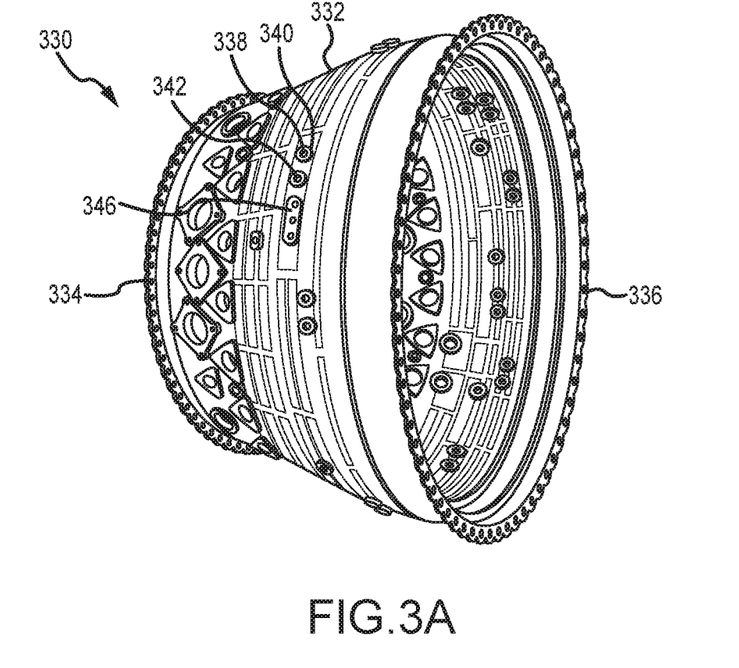
FIGS. 3A and 3B are perspective schematic views of a diffuser outer case and brackets mounted thereto, in accordance with various embodiments.
Figure 3B:
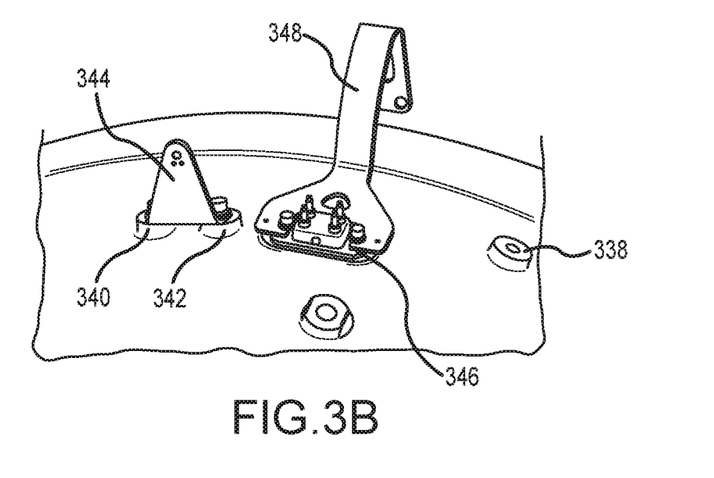

Referring now to FIGS. 3A and 3B, an outer diffuser case 330 is illustrated, in accordance with various embodiments. The outer diffuser case 330 may include a housing 332 concentrically located about a central axis, such as, for example, the central axis A referenced in FIG. 2. A forward flange 334 and an aft flange 336 project radially outward from the housing 332. In various embodiments, the forward flange 334 and the aft flange 336 may be substantially annular in shape and circumferentially continuous, with the forward flange 334 located axially upstream of the of the aft flange 336. In various embodiments, the forward flange 334 may be detachably connected to a high pressure compressor, such as, for example, the high pressure compressor 52 described above with reference to FIG. 1, and the aft flange 336 may be detachably connected to a high pressure turbine, such as, for example, the high pressure turbine 54 described above with reference to FIG. 1. In various embodiments, the housing may also include a mid-flange, extending radially inward of the housing 332 and intermediate the forward flange 334 and the aft flange 336, configured to detachably connect with a corresponding inner diffuser case, such as, for example, the inner diffuser case 228 described above with reference to FIG. 2. In various embodiments, the outer diffuser case 330 may be made of Inconel 718 that is capable of withstanding the higher pressures and temperatures of current gas turbine engines, such as, for example, the gas turbine engine 20 described above with reference to FIG. 1.

In various embodiments, the outer diffuser case 330 includes one or more bosses 338 extending radially outward of the housing 332 that may be used to mount flanges to secure tubing or other componentry used during operation of a gas turbine engine. For example, in various embodiments, the outer diffuser case 330 may include a first boss 340 and a second boss 342 configured to support a first flange 344 and a third boss 346, having multiple threaded apertures, for supporting a second flange 348. In various embodiments, the first flange 344 and the second flange 348 may be configured to secure tubing, such as, for example, air tubing used to convey compressed air bled from a compressor from one location to another. Such tubing may also be used to convey lubricating fluids or even fuels from one location to another. A desirable feature of the outer diffuser case 330 is to provide a mount for various tubing used to convey fluids in a reliable fashion that is capable of withstanding cyclic fatigue due to repeated thermally and mechanically induced stresses that the outer diffuser case 330 experiences during normal operation.

Figure 4:
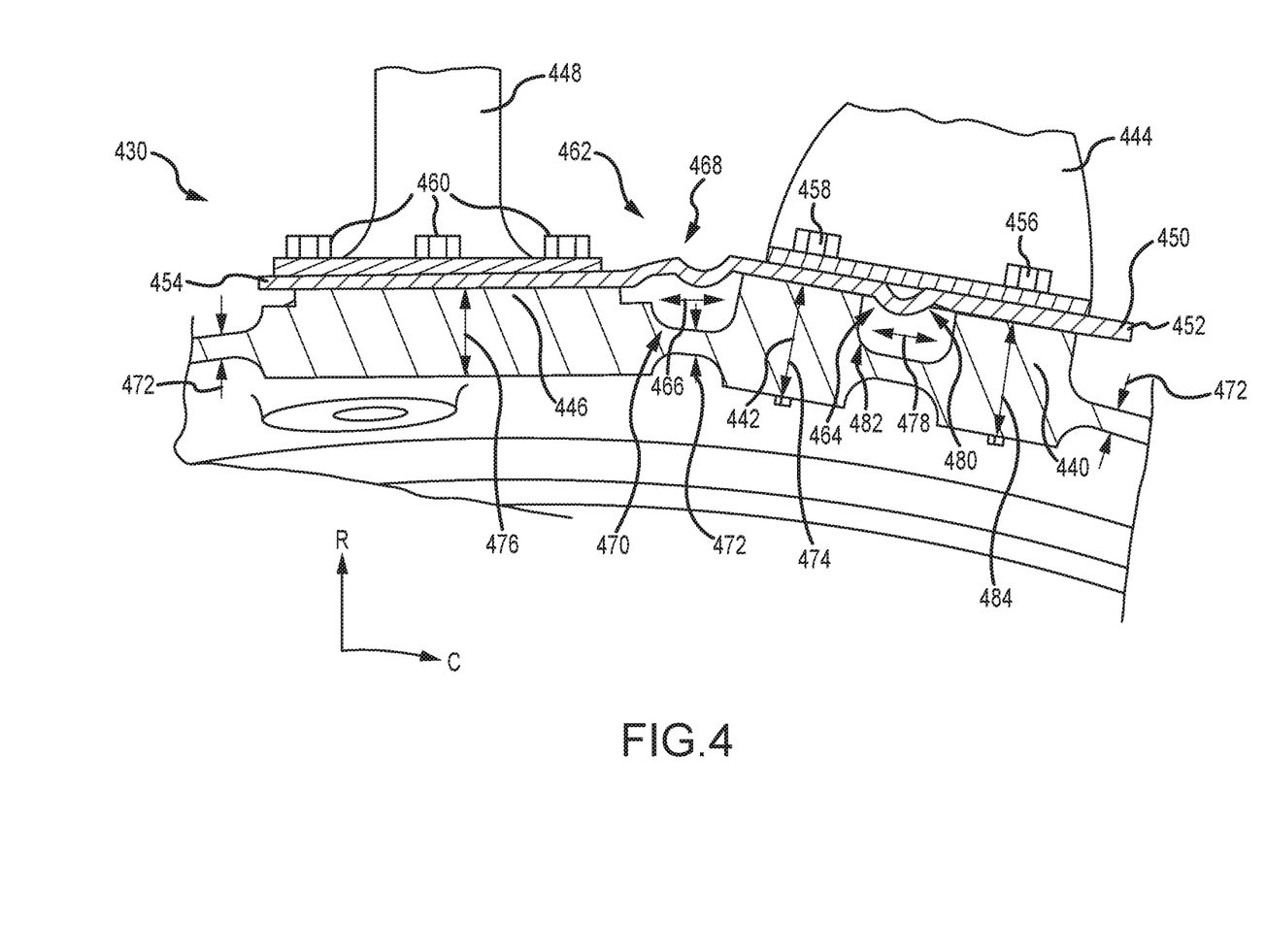
FIG. 4 is a schematic view of a balance bracket for a diffuser case, in accordance with various embodiments.

Referring now to FIG. 4, a balance bracket 450 is illustrated positioned on a portion of an outer diffuser case 430, in accordance with various embodiments. The balance bracket 450 is illustrated positioned between a first flange 444, which is mounted to a first boss 440 and to a second boss 442 and a second flange 448, which is mounted to a third boss 446. In various embodiments, the balance bracket 450 includes a first portion 452 that is configured for mounting to the first boss 440 and to the second boss 442 and a second portion 454 that is configured for mounting to the third boss 446. A first bolt 456 secures the first flange 444 and the first portion 452 of the balance bracket 450 to the first boss 440, while a second bolt 458 secures the first flange 444 and the first portion 452 of the balance bracket 450 to the second boss 442. Similarly, a first plurality of bolts 460 secures the second flange 448 and the second portion 454 of the balance bracket 450 to the third boss 446. In various embodiments, the balance bracket 450 includes a first undulating portion 462 that interconnects the first portion 452 and the second portion 454 of the balance bracket 450. A second undulating portion 464 is positioned within the first portion 452 of the balance bracket 450, at a location intermediate the first boss 440 and the second boss 442.

In various embodiments, the first undulating portion 462 enables the first portion 452 and the second portion 454 of the balance bracket 450 to expand away from one another, together with the underlying bosses—e.g., the first boss 440 and the second boss 442, underlying the first portion 452, and the third boss 446, underlying the second portion 454, respectively—in circumstances where the outer diffuser case 430 expands radially outward due to thermal heating. In various embodiments, such expansion of the outer diffuser case 430 in a radial direction R will result in a circumferential expansion—e.g., a first circumferential expansion 466 in a circumferential direction C. The first undulating portion 462 provides additional material along a first localized portion 468 of the balance bracket 450 that allows the bracket to expand with the outer diffuser case 430. In various embodiments, the additional material takes the form of a radial inward or outward bend or crease that provides a tolerance to tensile expansion and that facilitates the first circumferential expansion 466 of the outer diffuser case 430 while, at the same time, providing support to a first localized region 470 of the outer diffuser case 430 that may be subject to stress concentrations. In various embodiments, the stress concentrations may arise due to localized regions of small radius of curvature proximate sharp transitions in thickness between a nominal thickness 472 of the outer diffuser case 430 and the thicknesses of the boss structures—e.g., a second boss thickness 474 and a third boss thickness 476.

Similarly, in various embodiments, the second undulating portion 464 enables an interior portion of the first portion 452 of the balance bracket 450 to expand, together with the underlying bosses—e.g., the first boss 440 and the second boss 442 underlying the first portion 452—in circumstances where the outer diffuser case 430 expands radially outward due to thermal heating. In various embodiments, such expansion of the outer diffuser case 430 in a radial direction R will result in a circumferential expansion—e.g., a second circumferential expansion 478 in a circumferential direction C. The second undulating portion 464 provides extra material along a second localized portion 480 of the balance bracket 450. The extra material facilitates the second circumferential expansion 478 of the outer diffuser case 430 while, at the same time, providing support to a second localized region 482 that may be subject to stress concentrations. In various embodiments, the stress concentrations may arise due to localized regions of small radius of curvature proximate sharp transitions in thickness between the nominal thickness 472 of the outer diffuser case 430 and the thicknesses of the boss structures—e.g., the second boss thickness 474 and a first boss thickness 484.

Figure 5A:
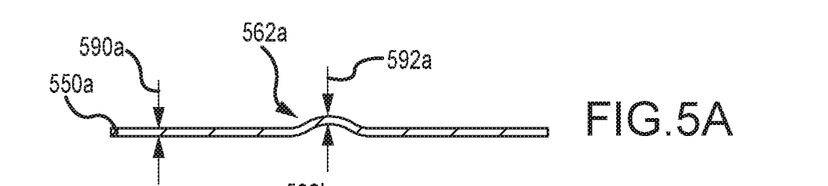
FIGS. 5A, 5B, 5C, 5D, and 5E are cross sectional schematic views of balance brackets, in accordance with various embodiments.
Figure 5B:
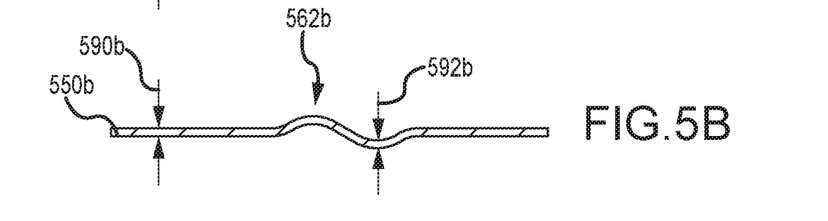

Referring now to FIGS. 5A-5E, various cross sectional geometries of undulating portions of balance brackets are described, in accordance with various embodiments. Referring to FIG. 5A, for example, a balance bracket 550a is illustrated in thickness cross section having an undulating portion 562a in the shape of a single hump or C-shape. The balance bracket 550a has a first thickness 590a (or nominal thickness) in a region used for mounting the balance bracket 550a to one or more bosses and a second thickness 592a in the undulating portion 562a. In various embodiments, the second thickness 592a may be less than or equal to the value of the first thickness 590a. Referring to FIG. 5B, a balance bracket 550b is illustrated thickness cross section having an undulating portion 562B in the shape of a sine wave or S-shape. Similarly to the foregoing, the balance bracket 550b has a first thickness 590b (or nominal thickness) in a region used for mounting the balance bracket 550b to one or more bosses and a second thickness 592b in the undulating portion 562b. In various embodiments, the second thickness 592b may be less than or equal to the value of the first thickness 590b. In various embodiments, varying the second thickness with respect to the first thickness provides a means with which to adjust the strength of the undulating portion with respect to the strength of an outer diffuser case, so as not to adversely affect or hinder the ability of the outer diffuser case to expand due to thermal loads during operation.

Figure 5C:
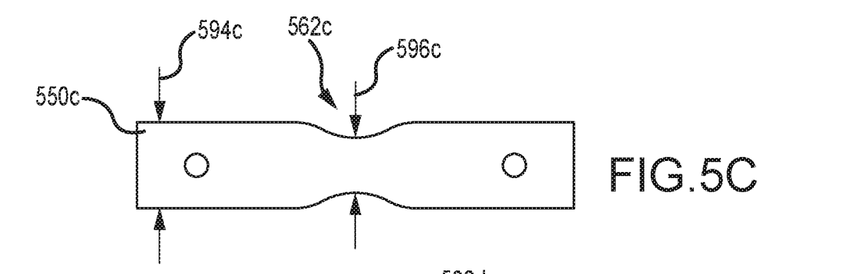
Figure 5D:
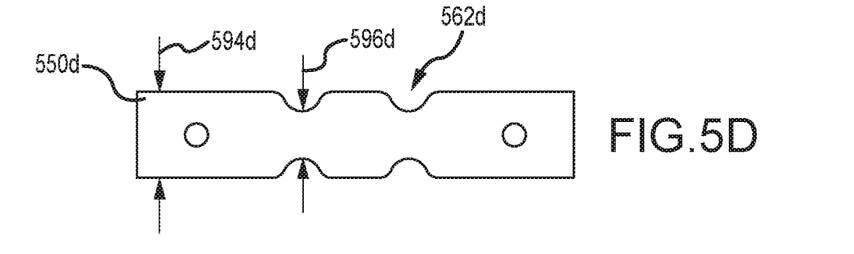

Referring now to FIG. 5C, a balance bracket 550c is illustrated in width cross section having an undulating portion 562c in the shape of an hour glass that, in various embodiments, has a reduced width in a central portion of the bracket. The balance bracket 550c has a first width 594c (or nominal width) in a region used for mounting the balance bracket 550c to one or more bosses and a second width 596c (or minimum width) in the undulating portion 562c. In various embodiments, the second width 596c may be less than or equal to the value of the first width 594c. Referring now to FIG. 5D, a balance bracket 550d is illustrated in width cross section having an undulating portion 562d in the shape of a double hour glass. The balance bracket 550d has a first width 594d (or nominal width) in a region used for mounting the balance bracket 550d to one or more bosses and a second width 596d (or minimum width) in the undulating portion 562d. In various embodiments, the second width 596d may be less than or equal to the value of the first width 594d. In various embodiments, varying the second width with respect to the first width provides a means with which to adjust the strength of the undulating portion with respect to the strength of an outer diffuser case, so as not to adversely affect or hinder the ability of the outer diffuser case to expand due to thermal loads during operation.

Figure 5E:
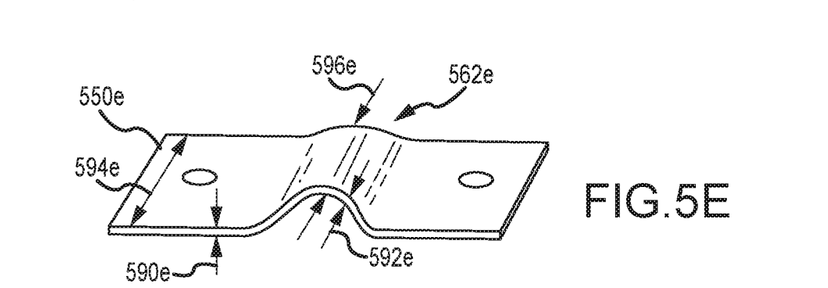

Referring now to FIG. 5E, a balance bracket 550e is illustrated having an undulating portion 562e in the shape of an hour glass in width and a C-shape in thickness—e.g., a combination of the embodiments illustrated in FIGS. 5A and 5C. The balance bracket 550e has a a first thickness 590e in a region used for mounting the balance bracket 550e to one or more bosses and a second thickness 592e in the undulating portion 562e. In various embodiments, the second thickness 592e may be less than or equal to the value of the first thickness 590e. Similarly, the balance bracket 550e has a first width 594e in a region used for mounting the balance bracket 550e to one or more bosses and a second width 596e (or minimum width) in the undulating portion 562e. In various embodiments, the second width 596e may be less than or equal to the value of the first width 594e. In various embodiments, varying the one or both of the second thickness and the second width with respect to the first thickness and the first width provides a means with which to adjust the strength of the undulating portion with respect to the strength of an outer diffuser case, so as not to adversely affect or hinder the ability of the outer diffuser case to expand due to thermal loads during operation. For each of the foregoing embodiments, a thickness or width of any of the undulating portions that is less than the corresponding nominal thickness or width will generally provide a cross sectional area in a longitudinal direction of the balance bracket that is less than a corresponding nominal cross sectional area of the balance bracket.

In addition to the foregoing embodiments described with reference to FIGS. 5A-5E, in various embodiments, a balance bracket and any flanges positioned adjacent the balance bracket, may be constructed of materials that are softer than the material used to construct the outer diffuser case. By the term "softer," this disclosure contemplates materials used to construct the balance bracket (and any corresponding flanges) having, for example, moduli of elasticity that are lesser in value than those characterizing the materials used to construct the diffuser case. Such materials will enable expansion of the outer diffuser case due to thermal loads without adversely affecting or hindering such expansion.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A balance bracket for a diffuser case of a gas turbine engine, comprising:
   a first bracket portion configured for mounting to a first boss on the diffuser case;
   a second bracket portion configured for mounting to a second boss on the diffuser case, the second bracket portion spaced a distance from the first bracket portion; and
   a first undulating portion positioned intermediate the first bracket portion and the second bracket portion,
      wherein the first undulating portion is configured to enable the first bracket portion and the second bracket portion to expand away from one another in a circumferential direction, together with the first boss and the second boss, as the diffuser case expands radially outward due to thermal heating,
      wherein the first undulating portion defines a first width in a width cross section and wherein the first width is less than or equal in value to a nominal width of the first bracket portion of the balance bracket and wherein the first undulating portion includes an hourglass shape in the width cross section.

2. The balance bracket of claim 1, wherein the first undulating portion defines a first thickness in a thickness cross section and wherein the first thickness is less than or equal in value to a nominal thickness of the first bracket portion of the balance bracket.

3. The balance bracket of claim 2, wherein the first undulating portion includes a C-shape in the thickness cross section.

4. The balance bracket of claim 2, wherein the first undulating portion includes a S-shape in the thickness cross section.

5. The balance bracket of claim 1, wherein the first undulating portion includes a double hourglass shape in the width cross section.

6. The balance bracket of claim 1, wherein the first undulating portion defines a first thickness in a thickness cross section and wherein the first thickness is less than a nominal thickness of the first bracket portion of the balance bracket.

7. The balance bracket of claim 1, wherein the first bracket portion is configured for mounting to the first boss and to a third boss and wherein the balance bracket includes a second undulating portion positioned intermediate the first boss and the third boss.

8. The balance bracket of claim 7, wherein the first undulating portion defines a first cross sectional area and the second undulating portion defines a second cross sectional area and wherein at least one of the first cross sectional area and the second cross sectional area is less in value than a nominal cross sectional area of the balance bracket.

9. An outer diffuser case assembly for a gas turbine engine, comprising:
   a housing defining an outer surface and having a longitudinal axis;
   a first boss extending radially outward of the housing;
   a second boss extending radially outward of the housing; and
   a balance bracket, comprising:
      a first portion configured for mounting to the first boss;
      a second portion configured for mounting to the second boss, the second portion spaced a distance from the first portion; and
      a first undulating portion positioned intermediate the first portion and the second portion,
         wherein the first undulating portion is configured to enable the first bracket portion and the second bracket portion to expand away from one another in a circumferential direction, together with the first boss and the second boss, as the outer diffuser case assembly expands radially outward due to thermal heating,
         wherein the first undulating portion defines a first width in a width cross section and wherein the first width is less than or equal in value to a nominal width of the first portion of the balance bracket and
         wherein the first undulating portion includes an hourglass shape in the width cross section.

10. The outer diffuser case assembly of claim 9, wherein the first undulating portion defines a first thickness in a thickness cross section and wherein the first thickness is less than or equal in value to a nominal thickness of the first portion of the balance bracket.

11. The balance bracket of claim 10, wherein the first undulating portion includes at least one of a C-shape in the thickness cross section and a S-shape in the thickness cross section.

12. The balance bracket of claim 9, wherein the first portion is configured for mounting to the first boss and to a third boss and wherein the balance bracket includes a second undulating portion positioned intermediate the first boss and the third boss.

13. The balance bracket of claim 12, wherein the first undulating portion defines a first cross sectional area and the second undulating portion defines a second cross sectional area and wherein at least one of the first cross sectional area and the second cross sectional area is less in value than a nominal cross sectional area of the balance bracket.

14. A gas turbine engine, comprising:
a compressor; and
an outer diffuser case assembly positioned downstream of the compressor, the outer diffuser case assembly comprising;
  a housing defining an outer surface;
  a first boss extending radially outward of the housing;
  a second boss extending radially outward of the housing; and
  a balance bracket, comprising:
    a first portion configured for mounting to the first boss;
    a second portion configured for mounting to the second boss, the second portion spaced a distance from the first portion; and
    a first undulating portion positioned intermediate the first portion and the second portion,
    wherein the first undulating portion is configured to enable the first bracket portion and the second bracket portion to expand away from one another in a circumferential direction, together with the first boss and the second boss, as the outer diffuser case assembly expands radially outward due to thermal heating,
    wherein the first portion is configured for mounting to the first boss and to a third boss extending radially outward of the housing and
    wherein the balance bracket includes a second undulating portion positioned intermediate the first boss and the third boss.

15. The gas turbine engine of claim 14, wherein the first undulating portion defines a first thickness in a thickness cross section and wherein the first thickness is less than or equal in value to a nominal thickness of the first portion of the balance bracket and wherein the first undulating portion includes at least one of a C-shape in the thickness cross section and a S-shape in the thickness cross section.

* * * * *